(12) United States Patent
Bachmann et al.

(10) Patent No.: US 11,480,158 B2
(45) Date of Patent: Oct. 25, 2022

(54) METHOD OF RETROFITTING A WIND TURBINE WITH AN ENERGY GENERATING UNIT

(71) Applicant: Vestas Wind Systems A/S, Aarhus N. (DK)

(72) Inventors: Thomas Hedegaard Bachmann, Randers Nv (DK); Jesper Kofoed Jensen, Aalborg (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 16/496,674

(22) PCT Filed: Mar. 20, 2018

(86) PCT No.: PCT/DK2018/050050
§ 371 (c)(1),
(2) Date: Sep. 23, 2019

(87) PCT Pub. No.: WO2018/184642
PCT Pub. Date: Oct. 11, 2018

(65) Prior Publication Data
US 2020/0378367 A1 Dec. 3, 2020

Related U.S. Application Data

(60) Provisional application No. 62/482,248, filed on Apr. 6, 2017.

(51) Int. Cl.
*F03D 80/50* (2016.01)
*F03D 7/02* (2006.01)
*F03D 7/04* (2006.01)

(52) U.S. Cl.
CPC ............ *F03D 80/50* (2016.05); *F03D 7/0292* (2013.01); *F03D 7/042* (2013.01); *F03D 7/0224* (2013.01); *F05B 2230/80* (2013.01)

(58) Field of Classification Search
CPC ...... F03D 7/0292; F03D 7/042; F03D 7/0224; F03D 80/50; F05B 2230/80
See application file for complete search history.

(56) References Cited

U.S. PATENT DOCUMENTS

| | | | | |
|---|---|---|---|---|
| 2,152,963 | A | * | 4/1939 | Irwin .................... F03D 7/0204 290/55 |
| 4,311,434 | A | * | 1/1982 | Abe ...................... B66C 23/207 416/142 |

(Continued)

FOREIGN PATENT DOCUMENTS

| | | |
|---|---|---|
| CN | 1918349 A | 2/2007 |
| CN | 101627207 A | 1/2010 |

(Continued)

OTHER PUBLICATIONS

International Electrotechnical Commission, IEC 61400-1 Wind Energy Generation Systems Part 1: Design Requirements, 2018, 4th Ed., Sec. 7.6.3, Annex G, Annex H (Year: 2018).*

(Continued)

*Primary Examiner* — Kenneth Bomberg
*Assistant Examiner* — Adam W Brown
(74) *Attorney, Agent, or Firm* — Wood Herron & Evans LLP

(57) ABSTRACT

A method of retrofitting a wind turbine having a tower and a first energy generating unit with a second energy generation unit is disclosed. The wind turbine has been operated for a first period of time at a first tower life rate and has a first tower life expectancy design value. The method includes determining the tower life of the wind turbine tower used during the first period of time; determining the remaining tower life of the wind turbine tower; replacing the first energy generating unit with the second energy generating unit; and operating the retrofitted wind turbine at a second (Continued)

tower life rate less than the first tower life rate so as to extend the life expectancy value of the tower beyond the first tower life expectancy design value.

20 Claims, 15 Drawing Sheets

(56) References Cited

U.S. PATENT DOCUMENTS

| | | | | |
|---|---|---|---|---|
| 4,527,072 | A * | 7/1985 | van Degeer | F03D 7/0268 |
| | | | | 290/55 |
| 7,895,016 | B2 * | 2/2011 | Vittal | G06Q 10/06 |
| | | | | 702/184 |
| 7,964,983 | B2 * | 6/2011 | Rivoli | F03D 80/70 |
| | | | | 290/55 |
| 8,674,536 | B2 * | 3/2014 | Eitan | F03D 15/10 |
| | | | | 290/44 |
| 9,035,479 | B1 | 5/2015 | Gates | |
| 9,644,609 | B2 | 5/2017 | Turner et al. | |
| 9,816,483 | B2 | 11/2017 | Nakamura et al. | |
| 9,822,762 | B2 | 11/2017 | Kooijman et al. | |
| 9,846,976 | B2 * | 12/2017 | Van Duijvendijk | F03D 17/00 |
| 10,352,297 | B2 * | 7/2019 | Richert | H02P 9/04 |
| 10,584,680 | B2 | 3/2020 | Coultate | |
| 10,975,844 | B2 | 4/2021 | Spruce et al. | |
| 2010/0194222 | A1 | 8/2010 | Rivoli | |
| 2011/0123331 | A1 | 5/2011 | Stiesdal | |
| 2012/0161443 | A1 * | 6/2012 | Moser | F03D 15/00 |
| | | | | 290/44 |
| 2013/0243531 | A1 | 9/2013 | Fernandez Gomez et al. | |
| 2014/0039807 | A1 | 2/2014 | Van Duijvendijk | |
| 2014/0316838 | A1 * | 10/2014 | Zhou | G06Q 50/06 |
| | | | | 705/7.24 |
| 2018/8283981 | | 10/2018 | Brenner | |

FOREIGN PATENT DOCUMENTS

| | | |
|---|---|---|
| CN | 202001213 U | 10/2011 |
| CN | 202402219 U | 8/2012 |
| CN | 102792240 A | 11/2012 |
| CN | 103291536 A | 9/2013 |
| CN | 104765967 A | 7/2015 |
| CN | 204877806 U | 12/2015 |
| CN | 105226713 A | 1/2016 |
| CN | 205260226 U | 5/2016 |
| EP | 2634418 A2 | 9/2013 |
| EP | 2846041 A1 | 3/2015 |
| WO | 2015032854 A1 | 3/2015 |
| WO | 2016001455 A1 | 1/2016 |

OTHER PUBLICATIONS

China National Intellectual Property Administration, First Notification of Office Action in CN Application No. 201880029437.4, dated Jun. 5, 2020.
The International Bureau of WIPO, International Preliminary Report on Patentability in PCT Application No. PCT/DK2018/050050, dated Oct. 17, 2019.
European Patent Office, International Search Report and Written Opinion in PCT/DK2018/050050, dated Jun. 19, 2018.
European Patent Office, Decision to Grant corresponding EP Application No. 18713128.9, dated Apr. 9, 2021.
Intellectual Property India, Examination Report in IN Application No. 201917038501, dated Aug. 23, 2021.

* cited by examiner

METHOD OF RETROFITTING A WIND TURBINE WITH AN ENERGY GENERATING UNIT

TECHNICAL FIELD

The invention relates generally to wind turbines, and more particularly to a method of retrofitting a wind turbine having a tower and a first energy generating unit with a second, improved energy generating unit and operating the retrofitted wind turbine in such a manner as to extend the original life expectancy of the tower.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower and an energy generating unit positioned atop of the tower. The energy generating unit typically includes a nacelle to house a number of mechanical and electrical components, such as a generator, and a rotor operatively coupled to the components in the nacelle through a main shaft extending from the nacelle. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator.

Wind turbines are large electromechanical machines, and therefore are subject to wear and fatigue that diminishes the structural integrity of the wind turbine over time during operation of the wind turbine. Accordingly, wind turbines typically have an overall life expectancy design value. By way of example, current wind turbines typically have a life expectancy design value of about twenty years. Thus, the major wind turbine components, such as the tower, the foundation, and the energy generating unit, are individually designed to each last about twenty years. More particularly, each of these major components includes a total life based on cumulative fatigue damage. The concept of total life is not significantly time dependent, but primarily dependent on the loads applied throughout the life of the component. During operation, each component may be characterized by a life rate, which is the rate at which the component total life is being used up during operation. Unlike the total life, the component life rate depends on the loads (forces, moments, cycles, etc.) imposed on the particular component. Thus, for example, if the loads on a specific component are relatively low, then the component life rate is low and the component will typically last for a relatively long time. On the other hand, if the loads on the same component are relatively high, then the component life rate is correspondingly high and the component will last for a shorter period of time. Accordingly, wind turbine components may be designed such that at the expected loads during operation, the components will have a life rate such that the life expectancy design value is about twenty years. In this regard, and as applied to a wind turbine tower, at the expected loads on the tower during operation, the material type, the diameter of the tower, the thickness of the tower wall, and other parameters of the tower, for example, may be selected such that the life expectancy design value of the tower is about twenty years.

In some wind turbine installations, various wind turbine components, such as those associated with the energy generating unit, may have reliability issues such that regular maintenance and/or replacement must be performed in order to keep the wind turbine operational. The regular maintenance and/or replacement of these components results in higher than expected operating costs. Additionally, due to the wind turbine being taken offline during the maintenance or replacement operations, there is a corresponding reduction in actual power production from the wind turbine. In short, the wind turbine costs more than expected to operate and produces less power than expected. In severe cases, the return on investment in the wind turbine may be negatively impacted in such a scenario. More particularly, if the profit margins associated with the wind turbine unexpectedly decrease (i.e., well below expectations), then the wind turbine operator may not have sufficient time to recoup the original investment in the wind turbine in the amount of time allotted by the life expectancy design value and the financial viability of the wind turbine may be jeopardized.

In other wind turbine installations, the loads acting a component of the wind turbine may deviate from the expected design values, such that the component life rate is higher than anticipated and the wind turbine component's life expectancy decreases. In this case, the life expectancy of the various components may not be the same and the wind turbine will reach the end of its service life prior to all of the components having reached their respective life expectancy design values. Similar to the above, depending on the severity of the deviation between the actual loads and the design loads, the return on investment in the wind turbine may be negatively impacted in such a scenario. By way of example, it is believed that some wind turbines in operation today have energy generating units that impose higher than expected loads on their wind turbine towers such that the towers are aging at a rate significantly higher than expected. Consequently, the wind turbine towers are expected to reach the end of their service life long before their life expectancy design value. Thus, the wind turbine operator may not have sufficient time to recoup the original investment and the financial viability of the wind turbine may be jeopardized.

Wind turbine manufacturers and operators are seeking methodologies for addressing these and other problems in wind turbine operation. More particularly, wind turbine operators seek a solution to wind turbines that have higher than expected operating costs (e.g., due to low component reliability) and reduced power production. Wind turbine operators further seek a solution when the component life rates are higher, and perhaps significantly higher, than the design component life rates such that the service life of the wind turbine is significantly shortened.

SUMMARY

To these and other ends, a method of retrofitting a wind turbine having a tower and a first energy generating unit with a second energy generation unit is disclosed. The wind turbine has been operated for a first period of time at a first tower life rate and has a first tower life expectancy design value. The method includes determining the tower life of the wind turbine tower used during the first period of time; determining the remaining tower life of the wind turbine tower; replacing the first energy generating unit with the second energy generating unit; and operating the retrofitted wind turbine at a second tower life rate less than the first tower life rate so as to extend the service life of the retrofitted wind turbine tower beyond the first tower life expectancy design value to a second tower life expectancy value.

In an exemplary embodiment, the second energy generating unit has a life expectancy design value and the difference between the second tower life expectancy value and the first period of time is substantially equal to the life expectancy design value of the second energy generating unit. In this way, the service life of the tower and the second energy generating unit expire substantially at the same time. The step of operating the wind turbine at the second tower life rate may further include operating the wind turbine at a de-rated performance such that its power output lies within about 10%, and preferably within about 5%, of a rated power curve for the second energy generating unit. In an exemplary embodiment, operating the wind turbine at the second tower life rate may further include operating the wind turbine substantially at the rated power curve for the second energy generating unit. Thus, it may be possible to extend the service life of the wind turbine without sacrificing power production from the wind turbine.

In some existing wind turbine applications, the actual loads imposed on the wind turbine tower may differ from the estimated values used during the design of the wind turbine. In such cases, the step of determining the tower life of the wind turbine used during the first time period may further include inspecting the wind turbine tower and assigning and effective used tower life to the tower based on the inspection. The remaining tower life may then be determined from the assigned tower life used during the first time period. By way of example, the inspection may be through a visual inspection or a non-invasive inspection, such as ultrasound. In any event, this process allows the actual "age" of the tower to be determined.

In an exemplary embodiment, the step of operating the retrofitted wind turbine tower at the second tower life rate further includes maintaining an effective tower life rate below a predetermined threshold. In this regard, the method may include providing a controller and one or more sensors operatively coupled to the wind turbine; receiving information from the one or more sensors at the controller for indicating the loads acting on the tower; determining the effective tower life rate based on the information received from the one or more sensors; and altering the operation of the wind turbine using the controller in response to the effective tower life rate nearing or exceeding the predetermined threshold so as to reduce the loads acting on the tower. In one embodiment, altering the operation of the wind turbine so as to reduce loads on the tower includes pitching one or more blades on the second energy generating unit. Additionally, or alternatively, altering the operation of the wind turbine so as to reduce loads on the tower includes controlling the speed of the rotor on the second energy generating unit. For example, the speed of the rotor may be reduced. This may be achieved, for example, by a mechanical and/or electrical brake system.

In an exemplary embodiment, the method may further include determining a tower height at which the second energy generating unit may be operated, and increasing or decreasing the tower height of the retrofitted wind turbine in response to the determined tower height being greater or less than the height of the original wind turbine tower, respectively. Moreover, the method may further include determining a maximum tip height of the blades of the second energy generating unit, and decreasing the height of the tower in response to the tip height exceeding a maximum predetermined value. The maximum predetermined value for the blade tip may be informed, for example, by local or regional laws, regulations, and/or ordinances.

In one embodiment, the step of replacing the first energy generating unit with the second energy generating unit includes removing the first energy generating unit from an upper end of the tower; coupling a tower transition adaptor to the upper end of the tower, the tower transition adaptor having a first end with a first interface sized for engaging with an interface on the upper end of the tower, and a second end with a second interface sized for engaging with an interface on the second energy generating unit; and coupling the second energy generating unit to the second end of the tower transition adaptor.

In an alternative embodiment, the step of replacing the first energy generating unit with the second energy generating unit includes removing the first energy generating unit from an upper end of the tower; removing a portion of the existing tower to define a new tower interface; coupling a tower transition adaptor to the new tower interface, the tower transition having a first end with a first interface sized for engaging with an interface on the upper end of the tower, and a second end with a second interface sized for engaging with an interface on the second energy generating unit; and coupling the second energy generating unit to the second end of the tower transition adaptor. In one embodiment, the tower includes a plurality of tower sections, each tower section having a first end and a second end, and wherein removing a portion of the existing tower to define the new tower interface further includes removing at least one of the tower sections such that the new tower interface is defined by an end of a tower section. By way of example, removing at least one of the tower sections includes removing the uppermost tower section.

In another embodiment, the tower includes a plurality of tower section each tower section having a first end and a second end, and wherein removing a portion of the existing tower further comprises cutting a tower section at a location between the first and second ends such that the new tower interface is defined by the cut through the tower section. For example, cutting a tower section further includes cutting the uppermost tower section. In these embodiments, the sum of the height of the tower at the new tower interface and the length of the tower transition adaptor may be less than the height of the original tower.

In addition to the above, the tower transition adaptor may address a geometry mismatch between the tower and the second energy generating unit. In this regard and in an exemplary embodiment, the first interface of the tower transition adaptor has a size different than a size of the second interface of the tower transition adaptor. For example, the first and second interfaces of the tower transition adaptor may include annular flanges and the diameter of the annular flanges may different from each other.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
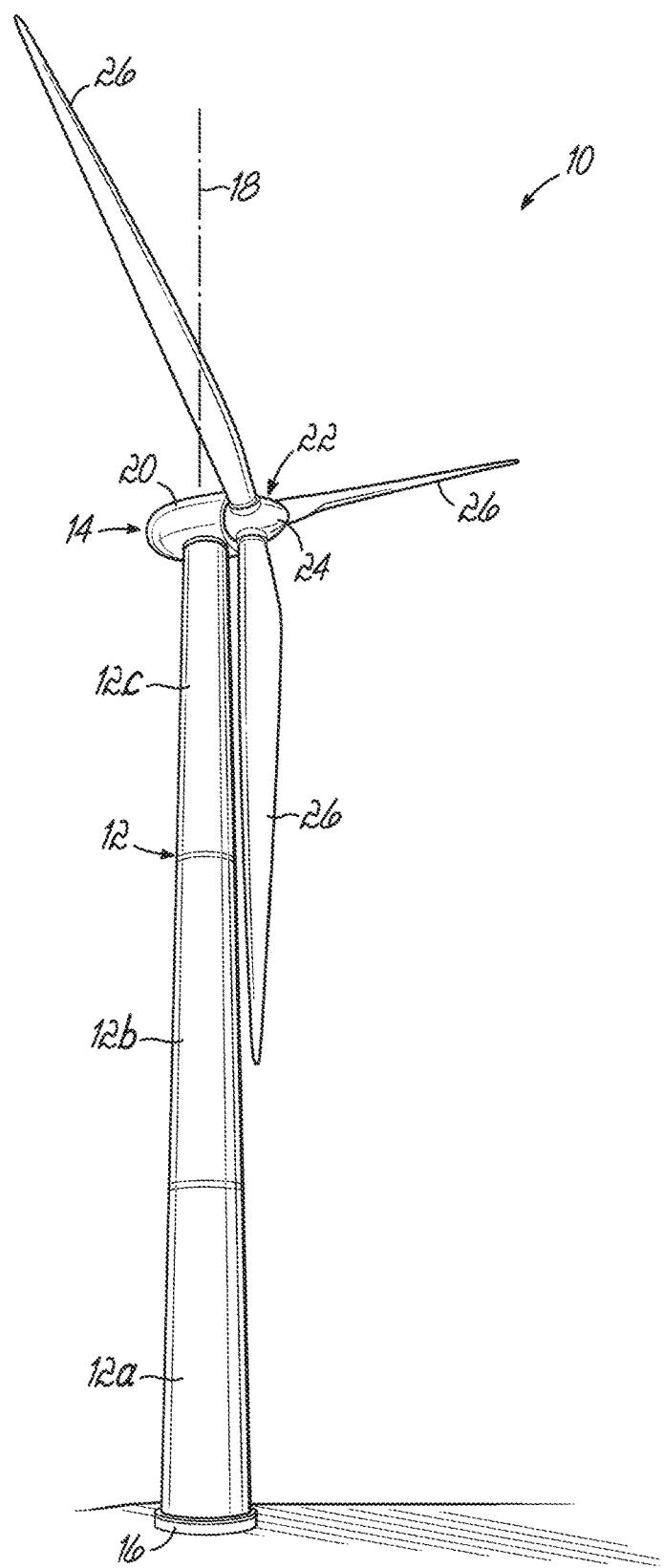
FIG. 1 is a perspective view of a wind turbine having a tower and a first energy generating unit.

With reference to FIG. 1, a wind turbine 10 includes a tower 12 and an energy generating unit 14 disposed at the apex of the tower 12. As is conventional, the tower 12 may be coupled to a foundation 16 at a lower end thereof and defines a generally vertical tower axis 18 about which the energy generating unit 14 may rotate via a yaw mechanism (not shown). The foundation 16 may be a relatively large mass, e.g., concrete, steel, etc. embedded in the ground and through which forces on the wind turbine 10 may be ultimately transferred. In an alternative embodiment, the foundation may include an offshore platform or the like used in offshore wind turbine applications. The energy generating unit 14 includes the part of the wind turbine which actually transforms the energy of the wind into electrical energy. In this regard, the energy generating unit 14 typically includes a housing or nacelle 20, a rotor 22 having a central hub 24 and one or more blades 26 (e.g., three blades) mounted to the hub 24 and extending radially therefrom, and a generator (not shown) for converting mechanical energy into electrical energy. In one embodiment, the energy generating unit 14 may further include a drive train (not shown), including a gear arrangement, interconnecting the rotor 22 and the generator. The generator and a substantial portion of the drive train may be positioned inside of the nacelle 20 of the wind turbine 10. In addition to the generator, the nacelle 20 typically houses miscellaneous components required for converting wind energy into electrical energy and various components needed to operate, control, and optimize the performance of the wind turbine 10. The wind turbine blades 26 are configured to interact with a free stream air flow (the wind) to produce lift that causes the rotor 22 to spin or rotate generally within a plane defined by the wind turbine blades 26. Thus, the energy generating unit 14 is able to generate power from the airflow that passes through the swept area of the rotor 22. The tower 12 supports the load presented by the energy generating unit 14 and also operates to elevate the energy generating unit 14, and especially the rotor 22, to a height above ground level or sea level at which faster moving air currents of lower turbulence are typically found.

Figure 2:
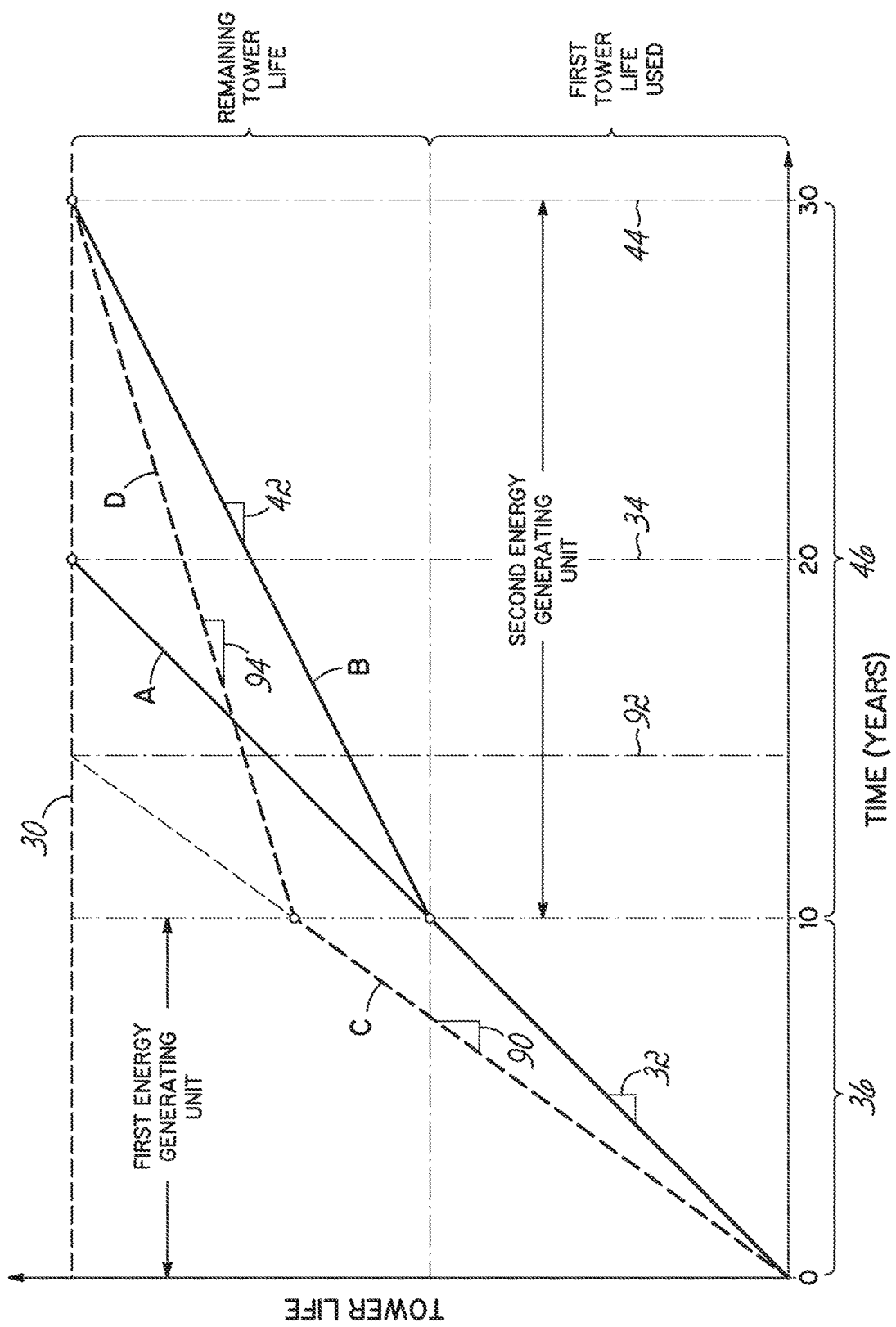
FIG. 2 is a schematic diagram of tower life versus time that conceptually demonstrates aspects of the present invention.

FIG. 2 is a schematic illustration of aspects of the present invention. As noted above, the various components of wind turbine 10 have a life expectancy design value and a component life rate during operation of the wind turbine 10. FIG. 2 is a schematic illustration showing the tower life over time. In general, the wind turbine tower 12 has a total tower life 30 that indicates the cumulative fatigue damage the tower 12 can accommodate before the structural integrity of the tower falls below an acceptable level (e.g., accounting for safety factors, etc.). As noted above, the total tower life 30 primarily depends on the total loads the tower 12 can withstand and is not significantly dependent on time. For example, the physical (e.g., diameter and thickness) and material properties of the tower 12 may primarily determine the value of the total tower life 30. During operation, the wind turbine 10, with tower 12 and first energy generating unit 14, utilizes tower life at a first tower life rate 32. Of course, if the first tower life rate 32 for a specific tower is high, then the life expectancy 34 of the tower 12 is relatively low, and if the first tower life rate 32 is relatively low, then the life expectancy 34 of the same tower 12 is relatively high. As one would expect, the tower life rate 32 generally depends on the loads acting on the tower 12, i.e., the higher the loads acting on the tower 12, the higher the tower life rate 32, and the lower the loads acting on the tower 12, the lower the tower life rate 32. As noted above, the tower 12 is generally designed with a life expectancy design value of about twenty years. Thus, with an estimate of the loads that will be imposed on the tower 12 during operation, a first tower life rate 32 may be estimated and the tower 12 may be designed (e.g., diameter, thickness, etc.) so as to have the desired life expectancy design value 34.

Curve A (solid line) illustrated in FIG. 2 represents the design curve for operation of wind turbine 10 having tower 12 and the first energy generating unit 14. The slope of curve A represents the first tower life rate 32 experienced by tower 12 during operation of the wind turbine 10. Curve A reaches the total tower life 30 at a first life expectancy design value 34, which as noted above may be about twenty years. For purposes of illustration, the first tower life rate 32 is shown as being substantially constant during operation of the wind turbine 10 such that curve A is represented by a straight line. It should be recognized, however, that in real life the first tower life rate 32 may not necessarily be constant such that curve A may be generally curvilinear. Alternatively, the first tower life rate 32 may represent an average or effective value such that the design curve is essentially a straight line.

As noted above, for some wind turbine installations, wind turbine components, such as various bearings, gear box components, generator components, converter components, hub and blade components, etc., may have reliability issues such that the costs for maintaining the wind turbine 10 in an operational state may be unexpectedly high. In some cases, the costs may be so high that the return on investment in the wind turbine 10 may be significantly compromised and the wind turbine operator may take a financial loss with further operation of the wind turbine 10. In some instances, for example, a business case may be made that it is better to discontinue operation of the wind turbine rather than continue operation until the end of the service life of the wind turbine. Aspects of the present invention address these issues and provide a solution that allows wind turbine operators to extend operation of the wind turbine and thereby be afforded an opportunity to achieve a return on their investment.

In this regard and in accordance with an aspect of the invention, one approach available to wind turbine operators having wind turbines operating at higher than expected costs (and less than expected productivity) as a result of reliability issues is to retrofit the wind turbine tower with another, improved energy generating unit and operate the wind turbine in a manner that extends the service life of the retrofitted wind turbine at least to and preferably beyond the service life of the original wind turbine. Since this approach calls for the same tower to be used for the second generating unit, the retrofitted wind turbine should be operated in a manner that extends the service life of the tower at least to and preferably beyond the life expectancy design value of the tower. This may be achieved, for example, if the loads imposed on the tower by the second energy generating unit are relatively low, and lower than the original design loads, such that the tower life rate after the retrofit is less than the first tower life rate 32 on the design curve A.

To this end, the inventors of the present application appreciate that not all energy generating units are created the same. In other words, the inventors appreciate that the loads on the tower 12 as a result of the operation of the wind turbine 10 may very well depend on the structural aspects of the energy generating unit and/or on how the energy generating unit is controlled during operation (i.e., the control strategy). Due to a plethora of blade designs, hub designs, nacelle designs and various control strategies for operating a wind turbine, the loads imposed on the tower through operation of the energy generating unit may be generally manufacturer specific. In this regard, some wind turbine manufacturers have designs and control strategies that result in relatively low loads being imposed on the tower during operation. If the second energy generating unit is properly selected, the loads imposed on the tower 12 during operation of the retrofitted wind turbine may be low enough to have a tower life rate sufficient to extend the service life of the tower beyond the original tower life expectancy design value 34. Thus, the wind turbine operator may operate the retrofitted wind turbine beyond the original life expectancy design value and provide additional time to recoup the investment in the wind turbine.

Curve B illustrated in FIG. 2 schematically represent just such a scenario. In this regard, the wind turbine 10 with tower 12 and first energy generating unit 14 may be operated for a first period of time 36. By way of example and without limitation, the first period of time 36 may be about 10 years and the tower 12 will have used about 50% of its total tower life 30 according to Curve A. Now suppose that during the first period of time 36 it is discovered that the wind turbine 10 has been operating at higher than expected costs such that the profit margins are relatively small and the return on investment in the wind turbine is in jeopardy. Instead of continuing operation of the wind turbine at a financial loss or discontinuing operation of the wind turbine, the inventors discovered that a benefit may be gained by retrofitting the wind turbine 10 by replacing the first energy generating unit 14 with a second, improved energy generating unit 40 that imposes relatively low loads on the wind turbine tower 12 during operation of the second energy generating unit 40. In other words, through the structural design of the various components of the second energy generating unit 40 and/or through the control strategies implemented by the second energy generating unit 40 during operation of the retrofitted wind turbine 10', the loading of the tower 12 may be significantly reduced from that experienced by the tower 12 during the first period of time 36 and with the first energy generating unit 14. In accordance with the invention, the reduced loading on the tower 12 during operation of the retrofitted wind turbine 10' provides a second tower life rate 42 that may be lower than the first tower life rate 32 with the first energy generating unit 14. This reduced loading of the tower 12 and its corresponding and reduced second tower life rate 42 are illustrated by curve B in FIG. 2.

In an exemplary embodiment, the second energy generating unit 40 may be operated so as to have a second tower life rate 42 that results in a second tower life expectancy value 44 that is equal to, and preferably exceeds, the first tower life expectancy design value 34. More particularly, the second energy generating unit 40 includes a life expectancy design value 46 and in order to completely use the full service life of the second energy generating unit 40, the second tower life rate 42 may be selectively controlled so that the second life expectancy value 44 of the tower 12 minus the first period of time 36 is substantially equal to the life expectancy design value 46 of the second energy generating unit 40. Stated another way, the sum of the first time period 36 and the life expectancy design value 46 of the second energy generating unit 40 is substantially equal to the second tower life expectancy value 44. In this way, the second energy generating unit 40 and the tower 12 reach the end of their service life at approximately the same time. By way of example, if the first period of time 36 is ten years and the life expectancy design value of the second energy generating unit 40 is the typical twenty years, then the second tower life rate 42 may be such that the second tower life expectancy is extended to thirty years.

Upon retrofitting the wind turbine 10 with the second energy generating unit 40, the goal is to maximize power production until the life expectancy of the second energy generating unit 40 and/or the tower 12 are reached (as noted above, preferably they reach the end of their service life together). A number of scenarios are possible here depending on the loads imposed on the tower 12 by the second energy generating unit 40. For example and without limitation, at the original height of the tower 12, it may be possible to operate the second energy generating unit 40 at a rated power curve so that the second tower life expectancy value 44 is substantially equal to the sum of the second energy generating unit life expectancy design value 46 (e.g., twenty years) and the first period of time 36. In other words, the second energy generating unit 40 is so gentle on the tower 12 that the service life of the retrofitted wind turbine tower 12' is extended to the second tower life expectancy value 44 without substantially any reduction in power production. Thus, it may be possible to extend the service life of the wind turbine tower without any sacrifice in power production from the retrofitted wind turbine.

In an alternative embodiment, however, there may be the case that at the rated power curve for the second energy generating unit 40, the service life of the tower 12 may expire before the service life of the second energy generating unit 40 expires (i.e., the second energy generating unit still has service life available). Thus, in order to extend the service life of the tower 12 by some amount (preferably a small amount) such that the service life of the tower 12 and the second energy generating unit 40 expire together, the retrofitted wind turbine 10' may be operated with a de-rated performance such that its power output lies slightly below the rated power curve. By way of example, the retrofitted wind turbine 10' may be operated with a power output within about 10%, and preferably within about 5%, of the rated power curve of the second energy generating unit 40. Because the wind turbine 10' is being operated at less than the rated power, the loads on the tower 12, and thus the tower life rate may be reduced so as to prolong the service life of the tower 12 and thereby match the service life of the second energy generating unit 40.

As evidenced from the above, there may be times when the operation of the retrofitted wind turbine 10' may be controlled in order to obtain the desired second tower life rate 42 and extend the service life of the tower 12 beyond its original life expectancy 34. As noted above, the tower life rate 42 depends on the loads being imposed on the tower 12 during operation of the retrofitted wind turbine 10'. The imposed loads on the tower 12 may be controlled to a certain extent through operation of the wind turbine 10'. In this regard and in an exemplary embodiment, the loads (e.g., forces, moments, etc.) on the tower 12 may be monitored to ensure that an averaged or effective tower life rate does not exceed a predetermined threshold. Should the effective tower life rate get near (e.g., within 5%) or exceed the predetermined rate threshold, then the operation of the retrofitted wind turbine 10' may be altered so as to reduce the load experienced by the tower 12 during operation.

Figure 3:
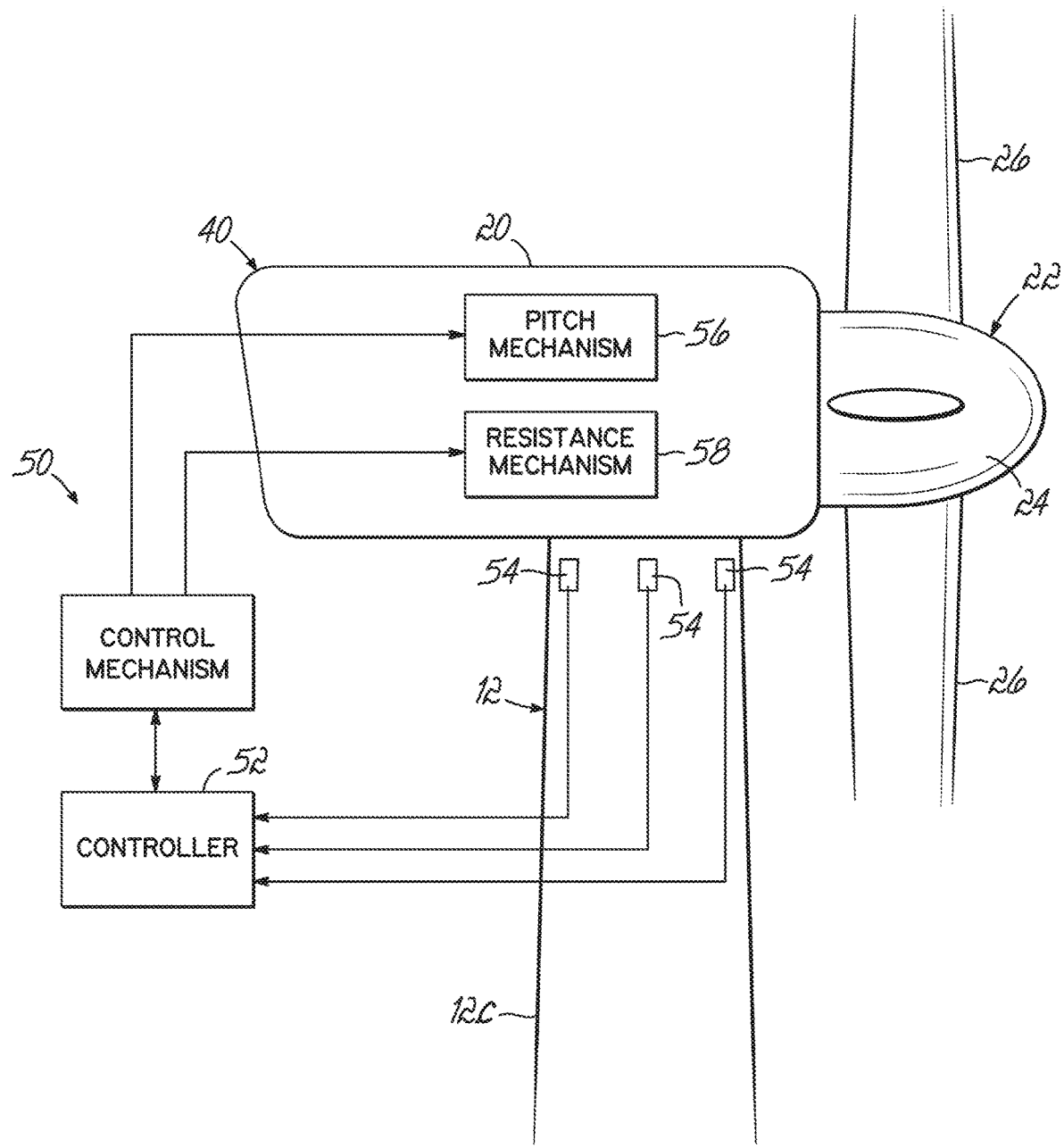
FIG. 3 illustrates an exemplary system for controlling the loads being imposed on the tower by an energy generating unit.

FIG. 3 illustrates an exemplary system 50 for monitoring the loads acting on the tower 12. In this regard, the system 50 includes a central controller 52 and one or more sensors 54 operatively coupled to the wind turbine 10' and configured to indicate, directly or indirectly, the loads acting on the tower 12. By way of example, the sensors 54 may be directly coupled to the tower 12 in one embodiment. In an alternative embodiment, however, the sensors 54 may be coupled to another part of the wind turbine 10' but configured to measure a parameter that correlates to the loads acting on the tower 12 (e.g., accelerometers located in the nacelle 20). The central controller 52 may be the primary controller for the wind turbine 10' or may be a separate controller which is operatively coupled to the primary controller of the wind turbine 10'. The sensors 54, which may include strain gauges, accelerometers, optical sensors, or the like, may be configured to send a signal to the controller 52 indicative of the load on the tower 12. The controller 52 may analyze the signal from the sensor 54 and store the data in a memory of the controller. After a certain amount of time, the collected data may be analyzed and averaged according to a selected algorithm to determine an effective tower life rate over that time period. The time period may be a day, a week, a month, or other time period which is typically shorter, and preferably much shorter, than the life expectancy design values of the wind turbine components. Once the effective tower life rate is determined, it may be compared to the predetermined threshold stored memory of the controller 52. As noted above, should the effective tower life rate be near or exceed the predetermined threshold, the controller 52 may send a signal to one or more control mechanisms associated with the wind turbine 10' that results in a reduction in the loads imposed on the tower 12.

In an exemplary embodiment, the controller 52 may be operatively coupled to a pitch mechanism 56 capable of pitching one or more of the blades 26 on the second energy generating unit 40. By pitching the blades 26 in an appropriate manner, wind energy may be dumped (i.e., allowed to pass by the wind turbine) so as to reduce the loads on the tower 12 and/or reduce the speed of the rotor 22. Additionally, or alternatively, the controller 52 may be operatively coupled to a resistance mechanism 58 that provides resistance to the rotation of the rotor 22 and thus controls the speed at which the rotor 22 rotates. By way of example, the resistance mechanism 58 may be a physical or electrical braking mechanism which may be used to reduce the speed of the rotor 22. For example, by regulating the power of the generator, the speed of the rotor 22 may be controlled (e.g., reduced). Through the operation of the resistance mechanism 58, the loads imposed on the tower may be reduced. It should be recognized, however, that there may be other ways to reduce the loads imposed on the tower 12 during operation of the wind turbine 10' and the invention is not limited to the specific examples provided above.

While in the above, the height of the wind turbine tower 12 was essentially maintained at its original height and the second energy generating unit 40 was coupled to the top end 60 of the original tower 12, depending on a number of factors, including the remaining life in the tower 12 and the loads imposed on the tower 12 by the second energy generating unit 40 during operation, it may be desirable to increase the height of the tower or decrease the height of the tower for operating the second energy generating unit 40 at a height different than the height of the original tower 12. For example, at the original height of the tower 12, it may be the case that operating the second energy generating unit 40 at the rated power curve results in the second tower life expectancy value being greater than the sum of the second energy generating unit life expectancy design value 46 and the first period of time 36, i.e., the service life of the tower 12 will outlast the service life of the second energy generating unit 40 even operating at the rated power curve (e.g., due to the low forces imposed on the tower 12 during operation). In this case, the height of the original tower 12 may be increased in order to locate the second energy generating unit 40 higher within the atmosphere where faster air currents and less turbulence exist. It is believed that the annual energy production (AEP) of the wind turbine will be increased as a result of the increased height. However, the increased height of the tower 12' increases the loads acting on the tower 12' (e.g., think of a cantilevered beam with a large load on its end) and thus increases the second tower life rate accordingly. Nevertheless, depending on the particular application, it may be possible to increase the height of the tower 12' and operate the second energy generating unit 40 at the rated power curve such that the wind turbine tower 12' and the second energy generating unit 40 reach the end of their service life at the same time (and at the life expectancy design value of the second energy generating unit).

Figure 4A:
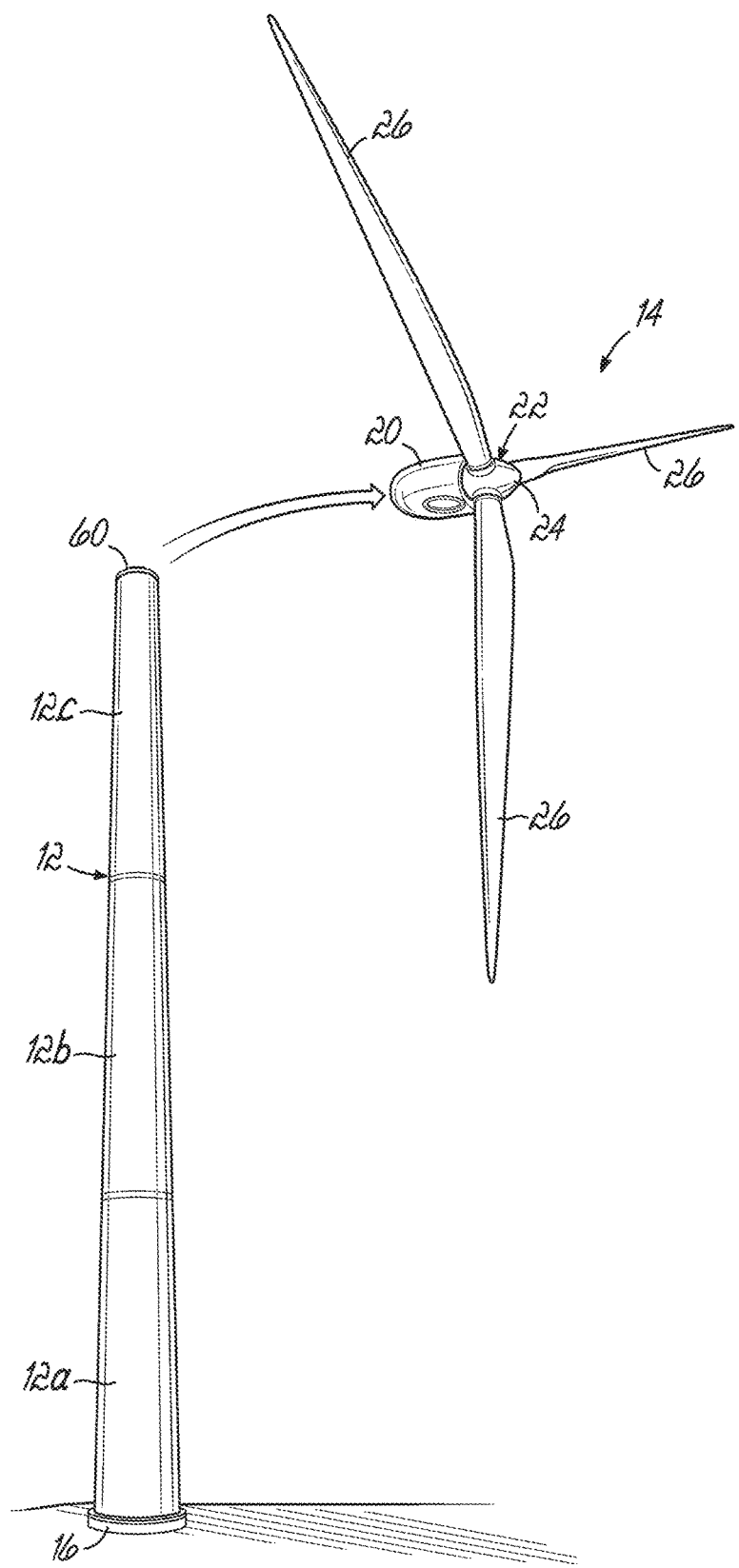
FIGS. 4A-4C illustrate a retrofit process according to one embodiment of the present invention.
Figure 4B:
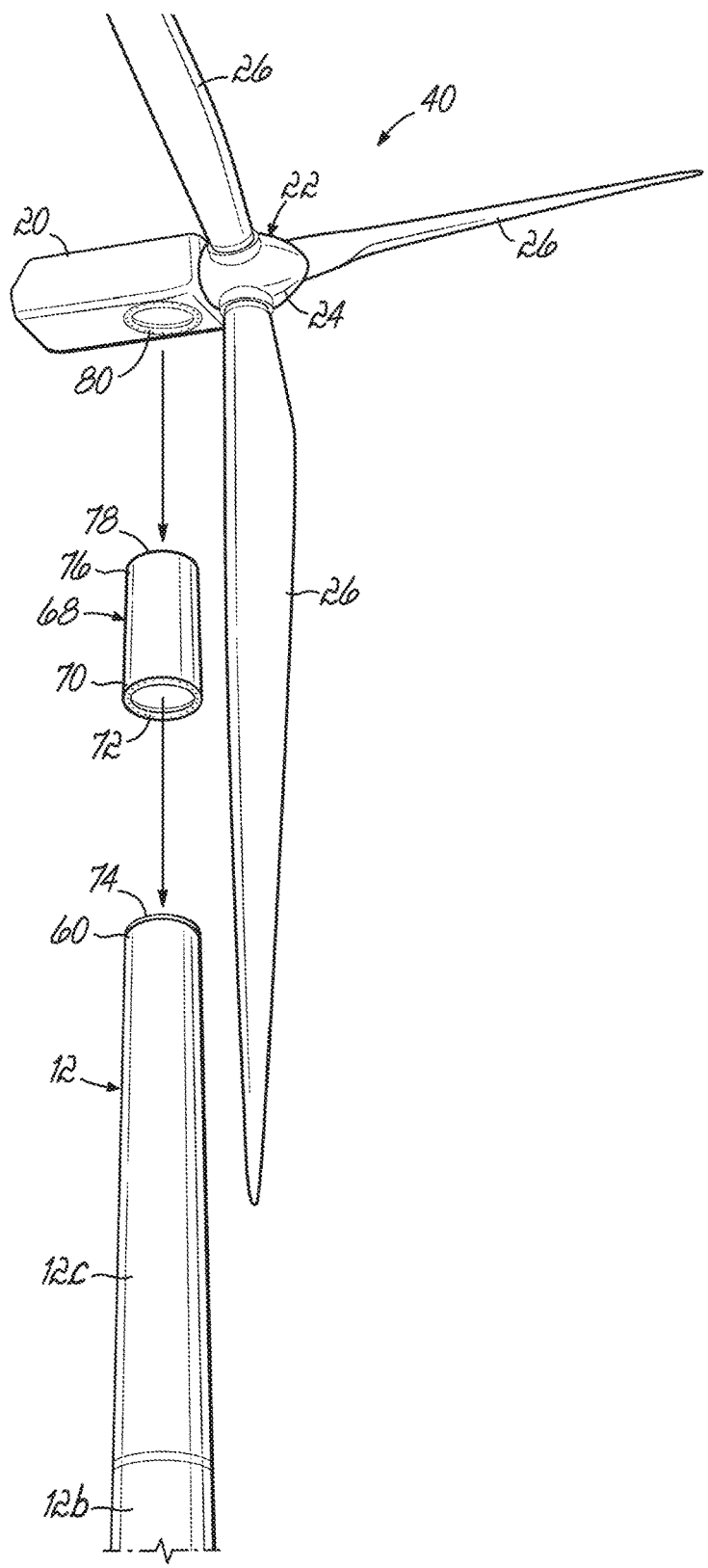
Figure 4C:
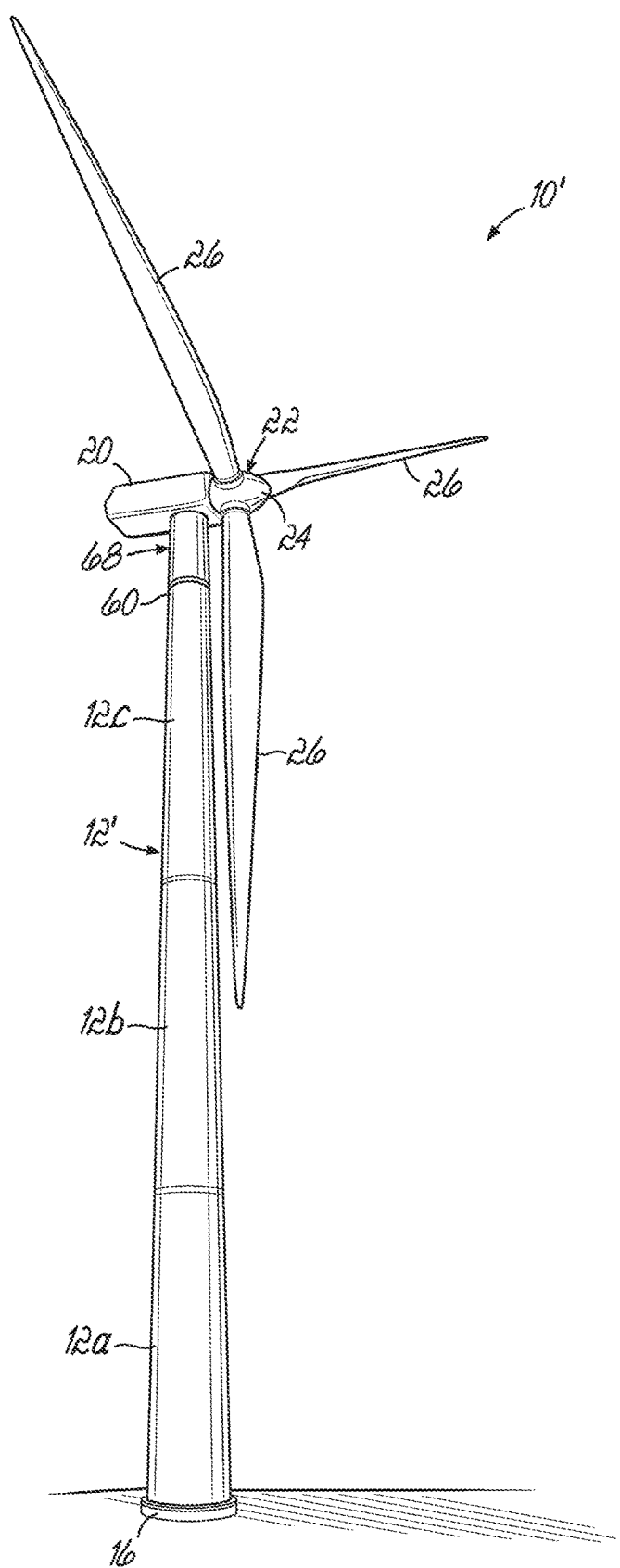

As illustrated in FIGS. 4A-4C, in an application where the height of the tower 12' may be increased and in an exemplary embodiment, a tower transition adaptor 68 may be added to the top end 60 of the original tower 12. In addition to increasing the height of the original tower 12, the tower transition adaptor 68 may also provide geometry matching between the top end 60 of the original tower 12 and the second energy generating unit 40. By way of example, the second energy generating unit 40 may be from a manufacturer different than the manufacturer of the tower 12 such that a geometry mismatch between the tower 12 and second energy generating unit 40 exists. The tower transition adaptor 68 may be used to address this issue. In this regard, the tower transition adaptor 68 includes a first end 70 with a first interface 72 sized for engaging with an interface 74 on the top end 60 of the tower 12. The tower transition adaptor 68 further includes a second end 76 with a second interface 78 sized for engaging with an interface 80 on the second energy generating unit 40. In an exemplary embodiment, the interfaces 72, 78 of the tower transition adaptor 68 may include a flange (e.g., an annular flange). The interfaces 74, 80 on the tower 12 and the second energy generating unit 40, respectively, may also include a flange. A fastener, such as a nut/bolt may be used to couple the respective flanges together, as is generally known in the art. In an alternative embodiment, the flanges may be omitted and the tower transition adaptor 68 may be coupled through welding, for example. In an exemplary embodiment, in order to resolve the potential mismatch between the tower 12 and the second energy generating unit 40, the size of the interfaces 72, 78 may be different from each other. More particularly, the diameter of the interfaces 72, 78 may be different. In one embodiment, for example, the diameter of the first interface 72 may be about 3 meters and the diameter of the second interface 78 may be about 4 meters. Other sizes, however, are possible depending on the particular application. Moreover, the length of the tower transition adaptor 68 may vary to locate the second energy generating unit 40 at the desired height. By way of example, the tower transition adaptor 68 may be between about 2 meters and about 30 meters in length. Again, other lengths may be possible depending on the particular application.

To retrofit the wind turbine 10, the first energy generating unit 14 may be removed from the tower 12 (FIG. 4A). This may be achieved by a crane (not shown) or other lifting device. Subsequently, the tower transition adaptor 68 may be coupled to the top end 60 of the tower 12. More particularly, the first interface 72 at the first end 70 of the tower transition adaptor 68 may be coupled to the interface 74 at the top end 60 of the tower 12, such as by welding or a flanged connection. Next, the second energy generating unit 40 may be coupled to the tower transition adaptor 68. This is illustrated in FIG. 4B. More particularly, the interface 80 of the second energy generating unit 40 may be coupled to the second interface 78 at the second end 76 of the tower transition adaptor 68, such as by welding or a flanged connection, to complete the retrofit process (FIG. 4C). It should be recognized that in an alternative embodiment, the second energy generating unit 40 may be coupled to the second end 76 of the tower transition adaptor 68 and then that assembly subsequently coupled to the top end 60 of the tower 12. In any event, subsequent to the retrofit process, the retrofitted wind turbine 10' may be returned to service and operated at the second tower life rate. The retrofitted wind turbine 10' should preferably be operational until the service life of the tower 12' and the second energy generating unit 40 have expired. By extending the service life of the wind turbine 10' through the retrofit process, the wind turbine operator may be provided additional time in which to obtain a return on their investment in the wind turbine.

In many regions where wind turbines are located, there may exist local or regional laws, regulations, ordinances, etc. which limit the height at which structures, such as wind turbines, may extend above the ground. These may exist, for example, as a safety precaution to avoid aviation accidents or for other safety considerations. In any event, when increasing the overall height of the retrofitted wind turbine 10', the wind turbine operator may want to verify the blade tip height when one of the blades 26 of the second energy generating unit 40 is at the twelve o'clock position (i.e., at the maximum height of the wind turbine 10') to ensure the retrofitted wind turbine 10' meets the applicable standards. If the tip height of the blades 26 exceed a predetermined threshold established by the laws, regulations, ordinances, etc. in which the retrofitted wind turbine 10' is located, then the height of the tower transition adaptor 68 (or possibly even the height of the original tower, see below) may have to be reduced in order to comply with the applicable laws, regulations, ordinances, etc.

Figure 5A:
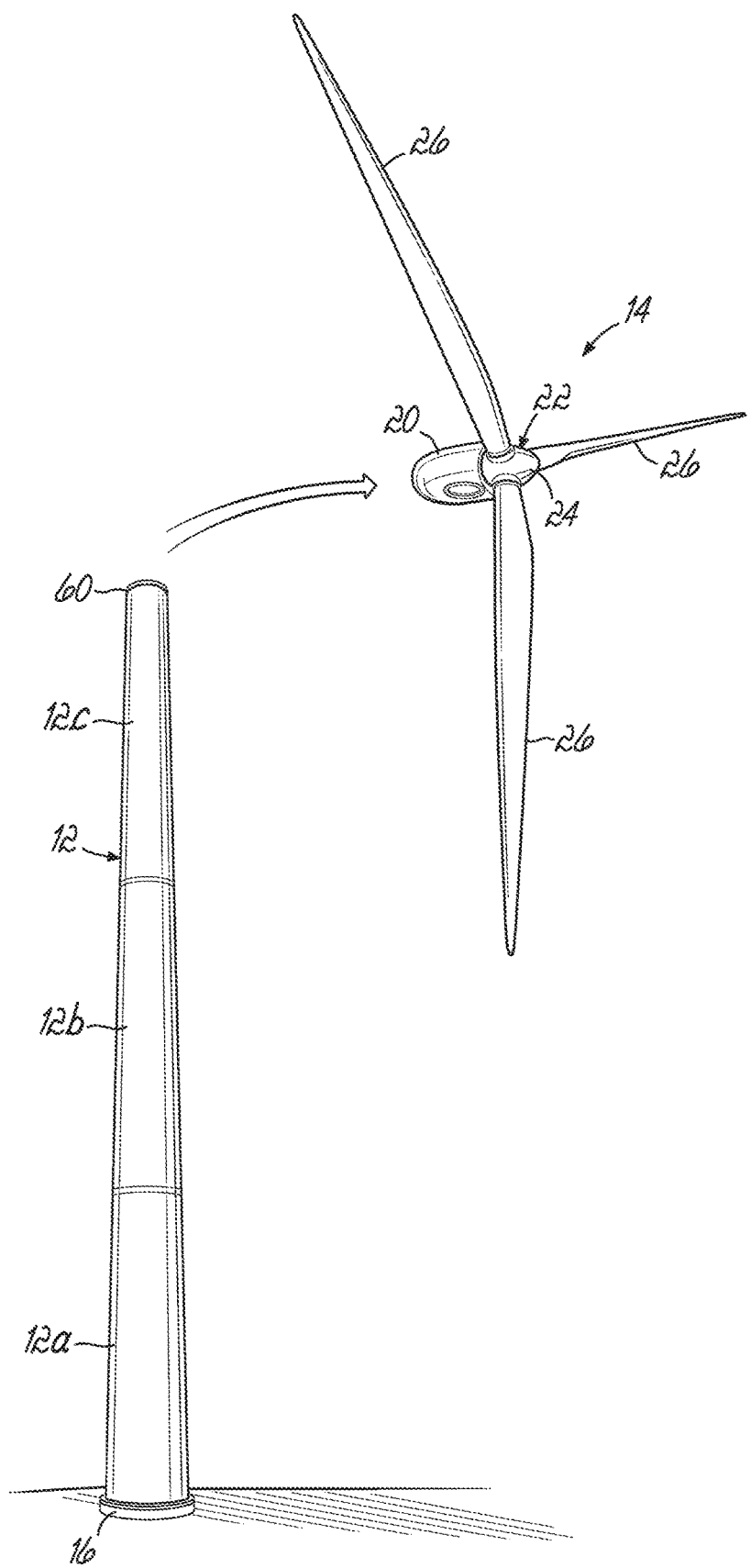
FIGS. 5A-5E illustrate a retrofit process according to another embodiment of the present invention.
Figure 5B:
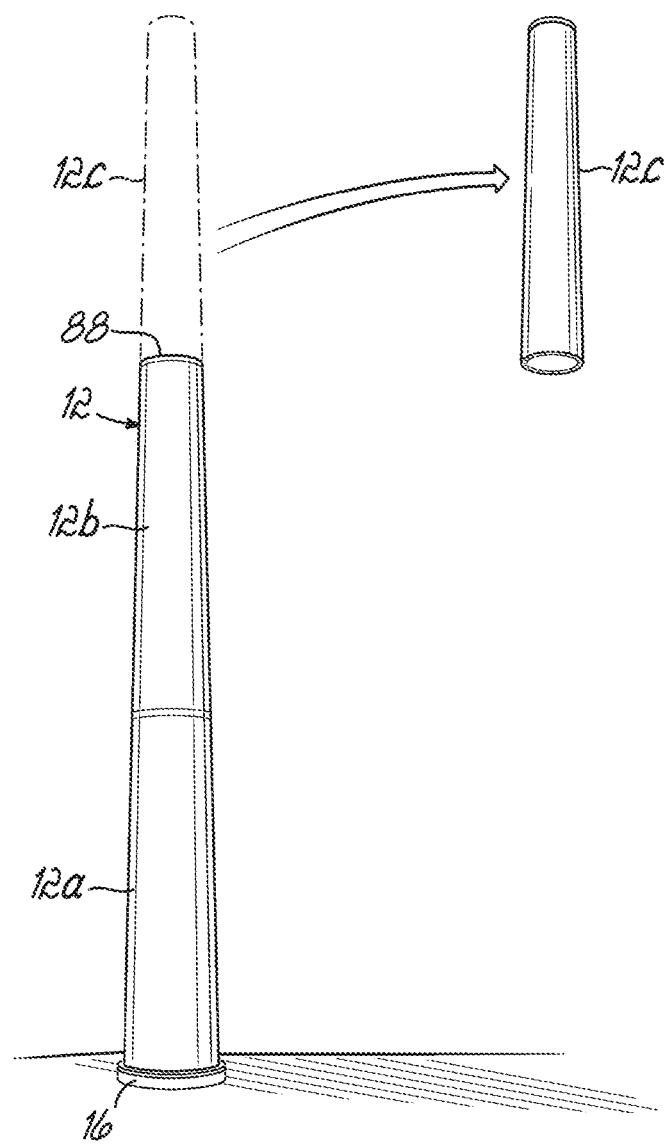

As described above, the tower transition adaptor 68 was added to the top end 60 of the original tower 12, such that substantially the entirety of the original tower 12 was "reused" in the retrofitted wind turbine 10'. This represents an efficient use of the existing structure in the retrofit process. The invention, however, is not limited to that embodiment. In this regard and in an alternative embodiment, a portion of the original tower 12 may be removed in order to establish a new tower interface at which the tower transition adaptor 68 may be coupled. As is generally known and as illustrated in FIG. 1, the tower 12 may include a plurality of stacked tower sections 12a, 12b, 12c that form the original tower 12. Three tower sections are shown here, but fewer or more tower sections are also possible. Each tower section 12a, 12b, 12c includes a first end and a second end which may be coupled to the foundation 16 (lowermost tower section), an adjacent tower section, or the energy generating unit 14 (the uppermost tower section). In one embodiment and as illustrated in FIGS. 5A-5E, one or more tower sections may be removed from the tower 12 such that the new tower interface 88 is established at an end of a remaining tower section. By way of example and as illustrated in FIGS. 5A and 5B, the uppermost tower section 12c may be removed from the tower 12 such that the new tower interface 88 is established at the upper end of the intermediate tower section 12b.

Figure 5C:
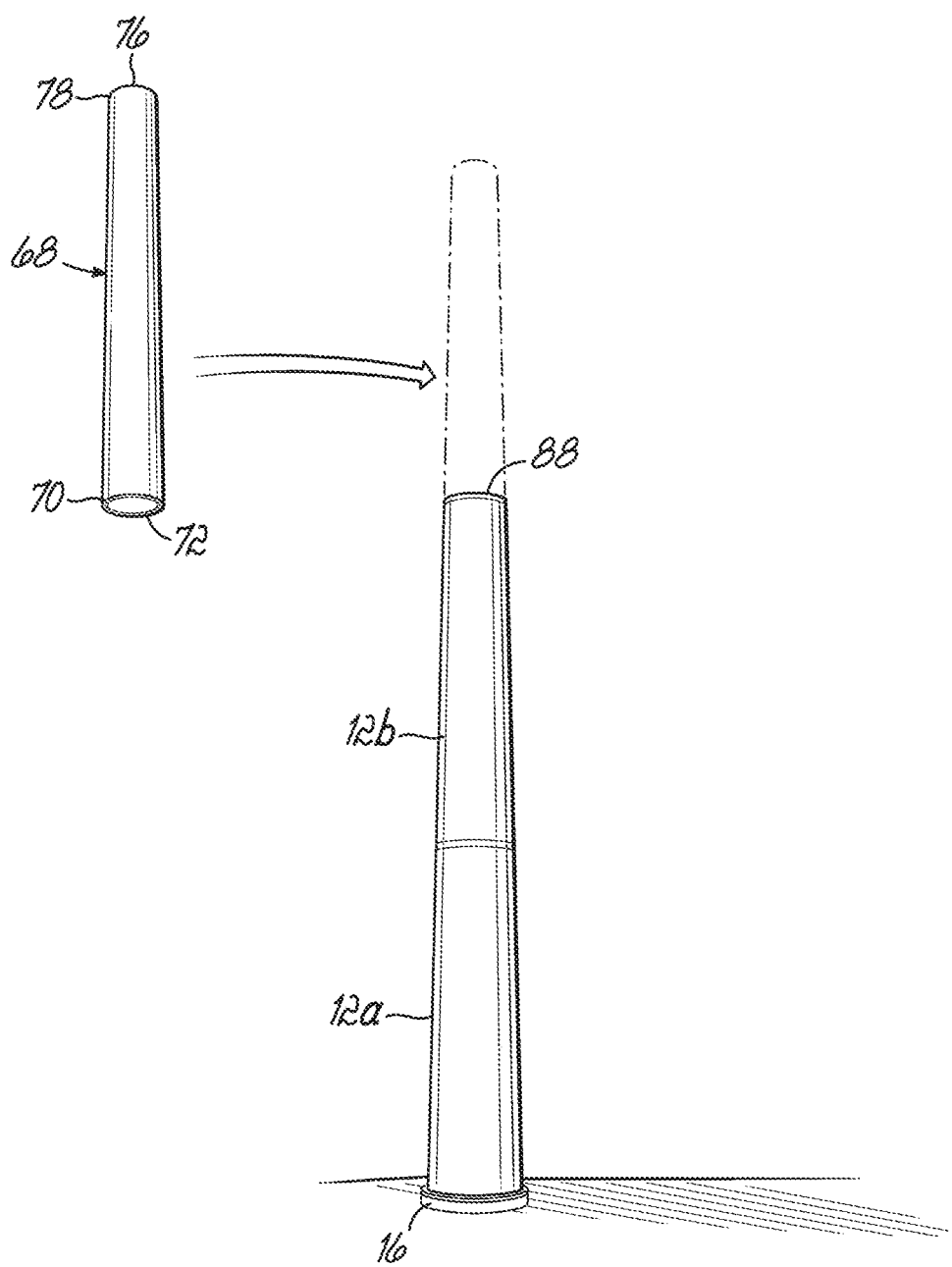
Figure 5D:
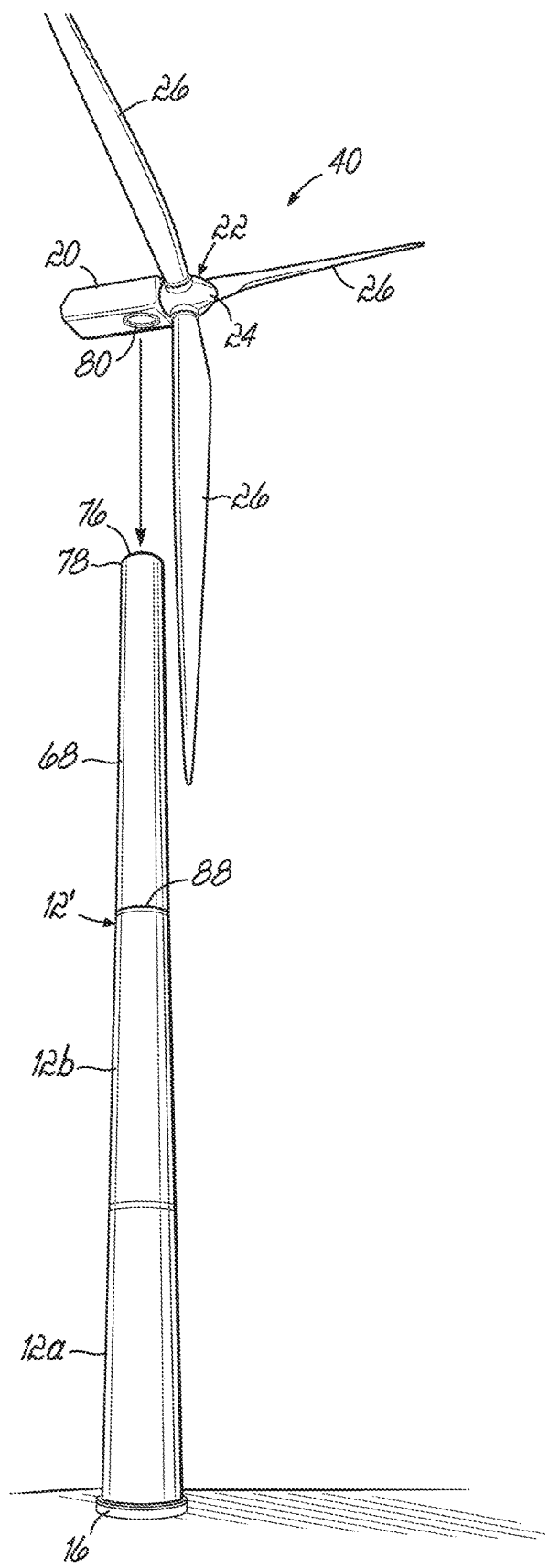
Figure 5E:
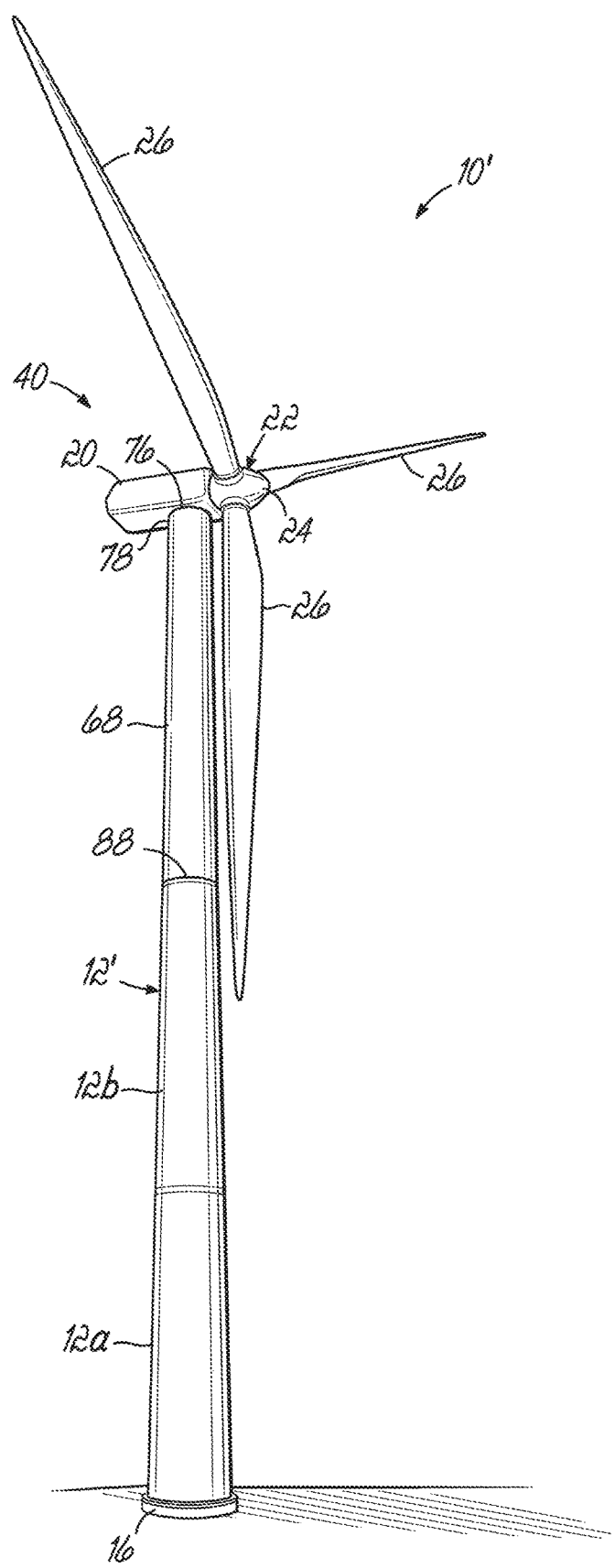

Once a portion of the tower 12 has been removed, the tower transition adaptor 68 may be coupled to the new tower interface 88, such as by welding or a flanged connection, for example. More particularly, the first interface 72 at the first end 70 of the tower transition adaptor 68 may be coupled to the new tower interface 88 at the top end of the intermediate tower section 12b (FIG. 5C). Next, the second energy generating unit 40 may be coupled to the tower transition adaptor 68. More particularly, the interface 80 of the second energy generating unit 40 may be coupled to the second interface 78 at the second end 76 of the tower transition adaptor 68 (FIG. 5D) to complete the retrofit process (FIG. 5E). It should be recognized that in an alternative embodiment, the second energy generating unit 40 may be coupled to the second end 76 of the tower transition adaptor 68 and then that assembly subsequently coupled to the new tower interface 88 at the top end of the intermediate tower section 12b. Additionally, the length of the tower transition adaptor 68 may be greater than that discussed above due to the removal of the uppermost tower section 12c as part of the retrofit process. In any event, subsequent to the retrofit process the retrofitted wind turbine 10' may be returned to service and operated at the second tower life rate. The retrofitted wind turbine 10' should preferably be operational until the service life of the tower 12' and the second energy generating unit 40 have expired. By extending the service life of the wind turbine 10' through the retrofitting process, the wind turbine operator may be provided additional time in which to obtain a return on investment in the wind turbine.

In the above where the uppermost tower section 12c is removed during the retrofit process, it should be recognized that the length of the tower transition adaptor 68 may be such that the new height of the tower 12' of the retrofitted wind turbine 10' may be greater than or less than the original height of the tower 12. At least one reason for making the height of the tower 12' greater than the original tower height is provided above (i.e., to be in a location of faster air currents and less turbulence). Such a situation is not always possible, however, and it should be recognized that there may be times when the height of the retrofit tower 12' may be less than the original height of the tower 12 in order to extend the service life of the wind turbine. For example and as noted above, there may be the case that at the rated power curve for the second energy generating unit 40, the service life of the tower 12 may expire before the service life of the second energy generating unit 40 expires. One approach as noted above is to operate the second energy generating unit 40 below the rated power curve. Another approach, however, is to decrease the height of the tower 12' of the retrofitted wind turbine 10'. Decreasing the height of the tower will decrease the loads imposed on the tower 12' by the second energy generating unit 40 during operation (again think of a cantilevered beam with a large load on its end). With the height of the tower 12' decreased relative to the original height of the tower 12, it may be possible to operate the second energy generating unit 40 at or near the rated power curve. Thus in embodiments in accordance with the present invention, the height of the tower 12' of the retrofitted wind turbine 10' may be less than the height of the tower 12 of the original wind turbine 10 but a benefit still be achieved.

As illustrated in FIGS. 6A-6D, in yet another embodiment and similar to the above, a portion of the original tower 12 may be removed in order to establish a new tower interface at which the tower transition adaptor 68 may be coupled. Unlike the previous embodiment in which the new tower interface 88 is established at an interface between adjacent tower sections, in this embodiment, a new tower interface 88 may be established by cutting a wind turbine tower section at a location between its first and second ends and coupling the tower transition adaptor 68 to the new tower interface 88 formed by the cutting operation. In this way, more of the original tower is reused in the retrofitted wind turbine.

Figure 6A:
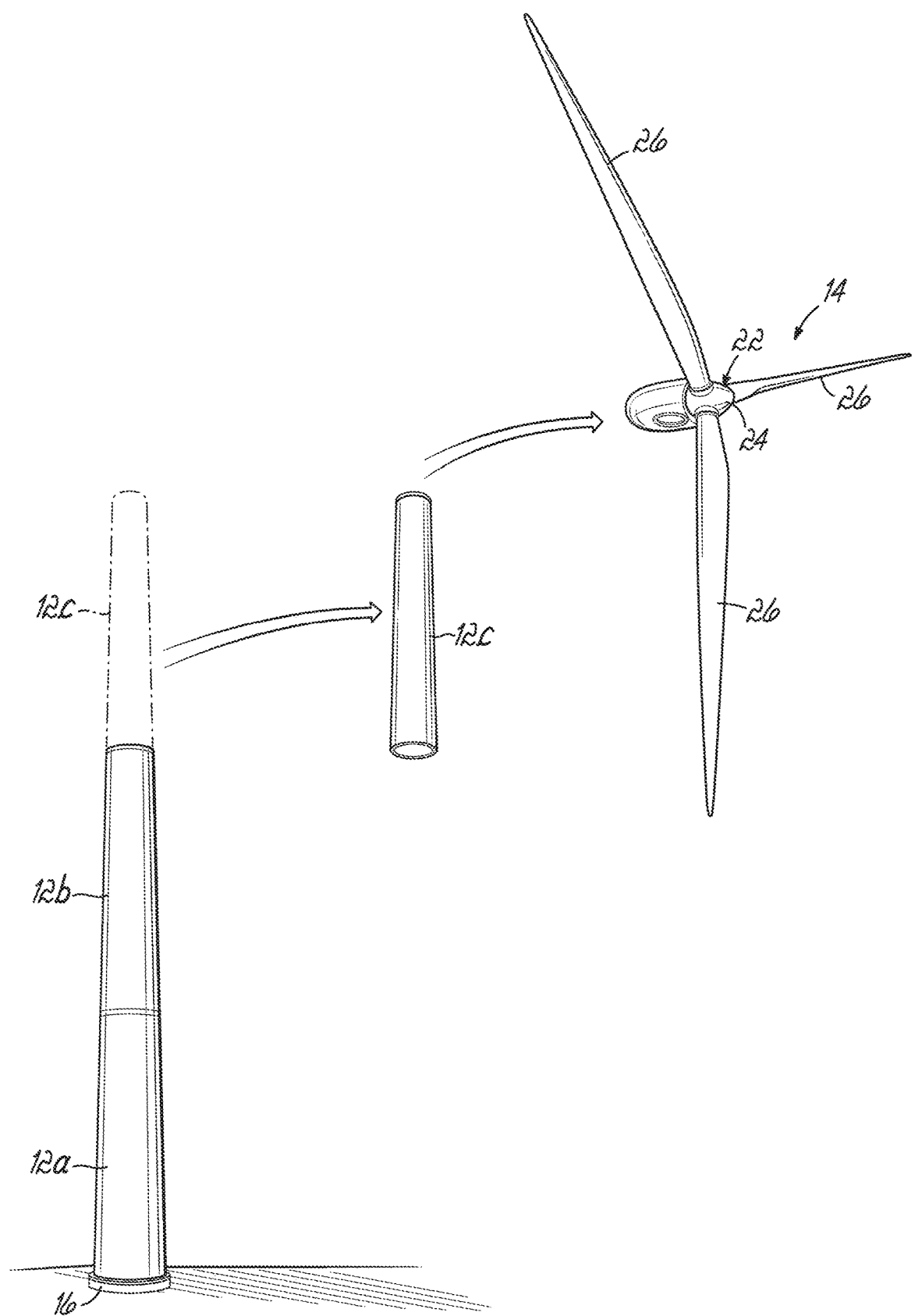
FIGS. 6A-6D illustrate a retrofit process according to another embodiment of the present invention.
Figure 6B:
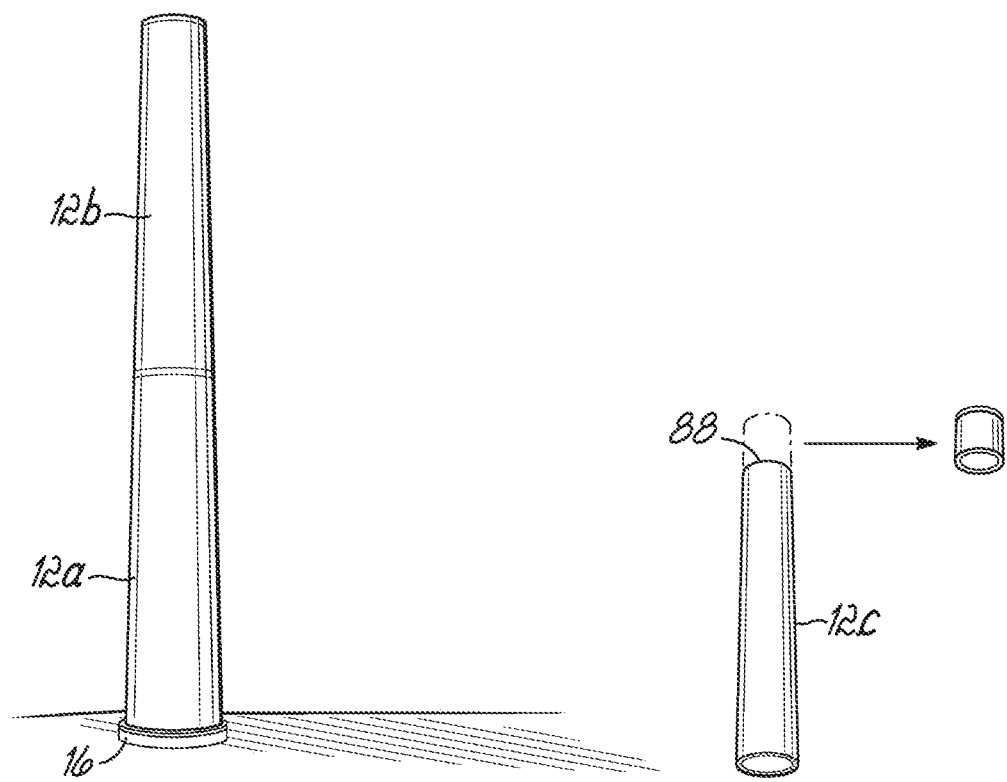

By way of example and as illustrated in FIGS. 6A and 6B, the uppermost tower section 12c may be removed from the tower 12 and cut such that the new tower interface 88 is established at a location between the first and second ends of the tower section 12c. In one embodiment, the tower section being cut may first be removed from tower 12 in order to perform the cutting operation. For example, the uppermost tower section 12c (which is being cut) may be removed along with the first energy generating unit 14 or removed from the tower 12 after the first energy generating unit 14 has been removed (i.e., separate steps). With the tower section 12c on the ground, the tower section 12c may be sent to a manufacturing facility to cut the tower section 12c and prepare the new tower interface 88 for coupling with the tower transition adaptor 68. Subsequently, the cut tower section may be sent back to the wind turbine site and coupled to the top end of the standing tower section 12b.

Figure 6C:
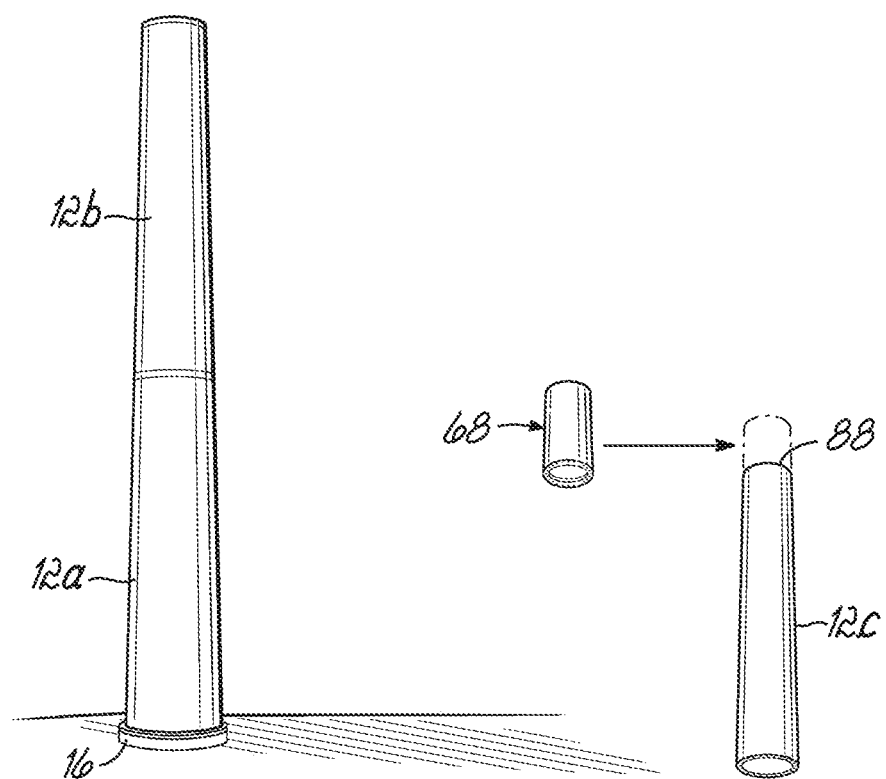
Figure 6D:
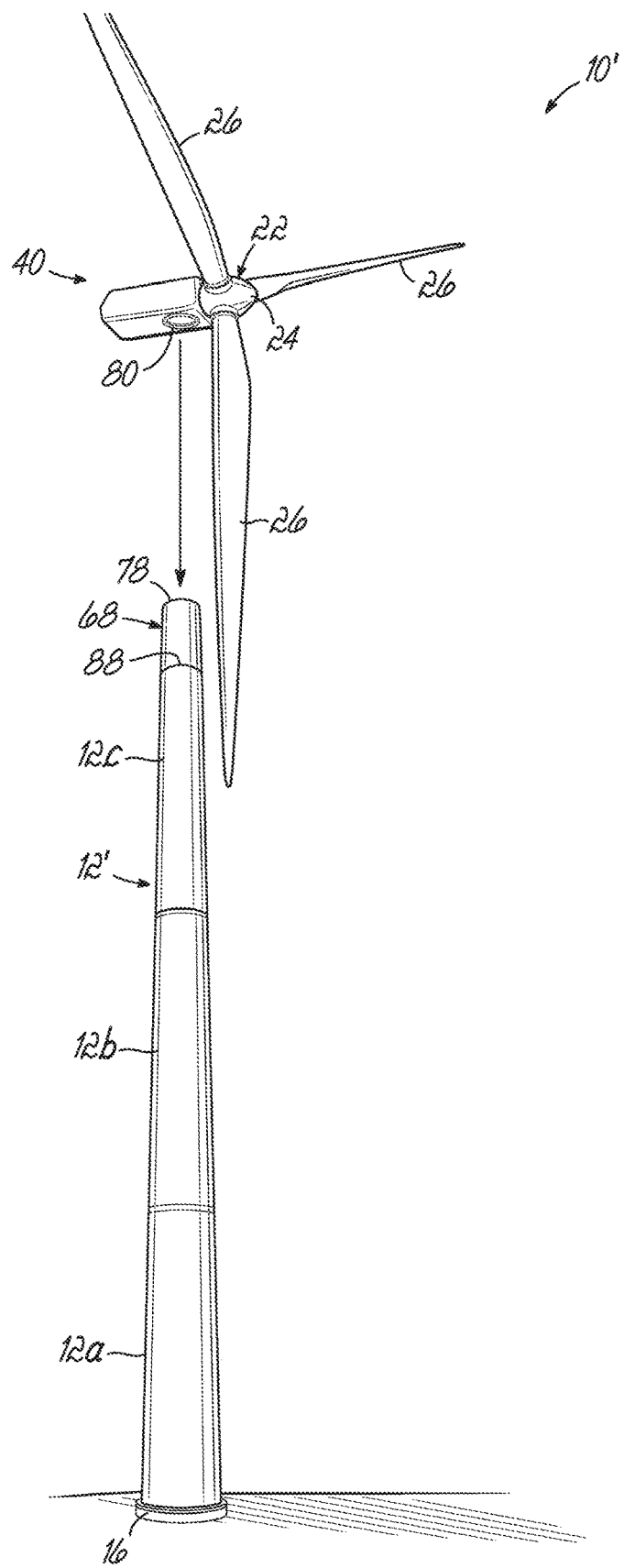

Next, the tower transition adaptor 68 may be coupled to the new tower interface 88. By way of example, the tower transition adaptor 68 may be welded to new tower interface 88. Alternatively, the tower transition adaptor may be coupled to the new tower interface 88 via a flanged connection. More particularly, the first interface 72 at the first end 70 of the tower transition adaptor 68 may be coupled to the new tower interface 88 at the site of the cut in the tower section 12c (FIG. 6C). The second energy generating unit 40 may then be coupled to the tower transition adaptor 68 (FIG. 6D). More particularly, the interface 80 of the second energy generating unit 40 may be coupled to the second interface 78 at the second end 76 of the tower transition adaptor 68. It should be recognized that in an alternative embodiment, the second energy generating unit 40 may be coupled to the second end 76 of the tower transition adaptor 68 and then that assembly subsequently coupled to the new tower interface 88 at the cut in the tower section 12c. It should further be recognized that in another alternative embodiment, the cut tower section 12c may be coupled to the tower transition adaptor 68 and to the second energy generating unit 40, and then that assembly subsequently coupled to the top end of the standing tower section 12b.

Subsequent to the retrofit process, the retrofitted wind turbine 10' may be returned to service and operated at the second tower life rate. The retrofitted wind turbine 10' should preferably be operational until the service life of the tower 12' and the second energy generating unit 40 have expired. By extending the service life of the wind turbine 10' through the retrofitting process, the wind turbine operator may be provided additional time in which to obtain a return on investment in the wind turbine. In this embodiment and similar to the above, it should be recognized that the length of the tower transition adaptor 68 may be such that the new height of the tower 12' of the retrofitted wind turbine 10' may be greater than or less than the original height of the tower 12. The tip height of the blades 26 may also be checked to confirm that the height of the retrofitted wind turbine 10' is within the applicable standards.

In summary, a financial case may be made to implement a retrofit process on a wind turbine even if it is operating along its design curve, e.g., curve A in FIG. 2. Again depending on several factors, including the remaining life of the tower and the loads that the second energy generating unit 40 imposes on the tower, a financial gain may be obtained by replacing the first energy generating unit 14 with the second, improved energy generating unit 40 and extending the life of the wind turbine as a whole beyond the service life of the original wind turbine. As discussed above, it may be possible to implement this retrofit process and still operate the retrofitted wind turbine at the rated power curve (i.e., no sacrifice in power production). This scenario is illustrated by curve E in FIG. 2. According to this embodiment, the second tower life rate 42 may be less than the first tower life rate 32 and may be selectively controlled so that the sum of the first time period 36 and the life expectancy design value 46 of the second energy generating unit 40 is substantially equal to the second tower life expectancy value 44. In this way, the second energy generating unit 40 and the tower 12 reach the end of their service life at approximately the same time. By way of example and without limitation, it is believed that wind turbine towers with as little as 20% of their total tower life 30 remaining may be subject to the retrofit process and provide a benefit to the wind turbine operator. These aspects of the present invention may apply to a wide range of wind turbines already in operation around the world.

In the above description, one motivation for implementing a retrofit process as discussed above is that due to low reliability of various wind turbine components, the wind turbine was operating a higher than expected costs and lower than expected power production such that financial viability was jeopardized. In that case and as laid out above, there may be financial reasons to implement the retrofit process in order to extend the service life of the tower and the wind turbine as a whole and increase the amount of time in which the wind turbine operator has to obtain a return on their investment. Aspects of the present invention, however, are not limited to such a situation. There may be several reasons why a wind turbine operator might perform a retrofit process as described above.

In this regard, in some wind turbine installations the estimated loads acting on the wind turbine tower 12 during operation may have been underestimated. In other words, the loads acting on the tower 12 during operation of the wind turbine 10 may be significantly higher than those estimated during the design phase of the wind turbine 10. There may be several reasons why a wind turbine tower may be subject to loads greater than the expected design loads. For example, the wind conditions might be stronger or more turbulent on the whole than expected. Another reason, however, is that some energy generating units are built and/or operated in a manner that result in relatively large loads being imposed on the tower 12. For whatever reason, the first tower life rate 32 according to the design may be lower than that being actually experienced by the wind turbine tower 12. Such a deviation from the design criteria may be difficult to detect initially and the wind turbine 10 may be operated for a first period of time 36 before a wind turbine operator either detects the issue or decides to take action to resolve the issue. Curve C (dashed line) illustrated in FIG. 2 schematically represents just such a scenario. In this scenario and as illustrated, the actual tower life rate 90 during operation of the wind turbine 10 for the first period of time 36 may be greater than the first tower life rate 32 such that at the end of the first period of time 36, the amount of tower life consumed is greater than the design value.

By way of example and without limitation, after a first period of time of about ten years of wind turbine operation, the tower 12 will have used about 50% of its total tower life 30 according to design curve A. However, suppose it is discovered that during the ten years of wind turbine operation, the operating loads on the tower 12 have been higher than expected such that about 66% of the total tower life has been used during the first period of time 36. In this regard, the amount of tower life used during the first time period 36 may be assigned as a result of conducting an inspection on the tower 12 and equating the state of the tower to an effective age that is typical in the normal course of operation. For example, upon inspection, the ten year old tower 12 may have characteristics more akin to a thirteen year old tower and be assigned a used tower life (and therefore a remaining tower life) consistent with a thirteen year old tower. The inspection may be, for example, a visual inspection and/or other non-invasive inspection techniques (e.g., ultrasound) conducted on the tower 12 by a structural specialist or the like. Once the used tower life has been assigned based on the inspection, the remaining tower life may be determined. By way of example, and according to the hypothetical example above, there may be about 33% of the tower life remaining at the end of the first time period 36. This inspection process is not limited to the current embodiment and may be implemented in most retrofit processes, event that described above, to confirm used tower life.

Should the wind turbine tower 12 be subject to higher than expected loads during operation, then service life of the tower 12 will deviate (i.e., decrease) from the life expectancy design value 34 of the tower 12. For example, at the higher loads, the service life of the tower 12 may be only about thirteen years instead of the full twenty years. This is illustrated by line 92 in FIG. 2. Thus, if not addressed, the tower 12 will reach the end of its service life while the other wind turbine components, such as the energy generating unit 14, have additional service life available. Due to the decrease in the service of the tower, the return on investment in the wind turbine 10 may be significantly compromised and the wind turbine operator may take a financial loss. Aspects of the present invention also address these issues and provide a solution that allows wind turbine operators to extend operation of the wind turbine and thereby be afforded an opportunity to achieve a return on their investment.

Again depending on several factors, including the remaining life of the tower and the loads that the second energy generating unit 40 imposes on the tower, a financial gain may be obtained by replacing the first energy generating unit 14 with the second, improved energy generating unit 40 and extending the life of the wind turbine as a whole at least to and preferably beyond the service life of the original wind turbine. As discussed above, it may be possible to implement this retrofit process and still operate the retrofitted wind turbine at the rated power curve (i.e., no sacrifice in power production). This scenario is illustrated by curve D in FIG. 2. According to this embodiment, the second tower life rate 94 may be less than the actual tower life rate 90 during the first period of time 36 and less than the first tower life rate 32 and may be selectively controlled so that the sum of the first time period 36 and the life expectancy design value 46 of the second energy generating unit 40 is substantially equal to the second tower life expectancy value 44. In this way, the second energy generating unit 40 and the tower 12 reach the end of their service life at approximately the same time.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:

1. A method of retrofitting a wind turbine having a tower and a first energy generating unit with a second energy generating unit, the wind turbine having been operated for a first period of time at a first tower life rate and having a first tower life expectancy design value, the method comprising:
   determining the tower life of the wind turbine tower used during the first period of time;
   determining the remaining tower life of the wind turbine tower;
   replacing the first energy generating unit with the second energy generating unit; and
   operating the retrofitted wind turbine at a second tower life rate less than the first tower life rate so as to extend the service life of the wind turbine tower beyond the first tower life expectancy design value to a second tower life expectancy value.

2. The method according to claim 1, wherein the second energy generating unit has a generating unit life expectancy design value, and wherein the difference between the second tower life expectancy value and the first period of time is substantially equal to the generating unit life expectancy design value.

3. The method according to claim 1, wherein operating the wind turbine at the second tower life rate further comprises operating the wind turbine within 10% of a rated power curve for the second energy generating unit.

4. The method according to claim 3, wherein operating the wind turbine at the second tower life rate further comprises operating the wind turbine at the rated power curve for the second energy generating unit.

5. The method according to claim 1, wherein determining the tower life of the wind turbine tower used during the first period of time further comprises:
   inspecting the wind turbine tower; and
   assigning an effective used tower life to the tower based on the inspection.

6. The method according to claim 1, wherein operating the retrofitted wind turbine at the second tower life rate further comprises maintaining an effective tower life rate below a predetermined threshold.

7. The method according to claim 6, wherein maintaining the effective tower life rate includes:
   measuring the loads acting on the tower over a period of time after replacing the first energy generating unit;
   determining the effective tower life rate based on the measured loads over the period of time; and
   reducing operating loads on the tower when the effective tower life rate determined is equal to or exceeds the predetermined threshold.

8. The method according to claim 7, wherein reducing operating loads on the tower comprises pitching one or more blades on the second energy generating unit.

9. The method according to claim 7, wherein reducing operating loads on the tower comprises controlling the speed of the rotor on the second energy generating unit.

10. The method according to claim 1, wherein operating the retrofitted wind turbine at the second tower life rate further comprises:
   determining a tower height at which the second energy generating unit may be operated; and
   increasing or decreasing the tower height of the retrofitted wind turbine in response to the determined tower height being greater or less than the height of the tower of the wind turbine, respectively.

11. The method according to claim 10, further comprising:
   determining a maximum tip height of the blades of the second energy generating unit; and
   decreasing the height of the tower in response to the tip height exceeding a maximum predetermined value.

12. The method according to claim 1, wherein replacing the first energy generating unit with the second energy generating unit further comprises:
   removing the first energy generating unit from an upper end of the tower;
   coupling a tower transition adaptor to the upper end of the tower, the tower transition adaptor having a first end with a first interface sized for engaging with an interface on the upper end of the tower and a second end with a second interface sized for engaging with an interface on the second energy generating unit; and
   coupling the second energy generating unit to the second end of the tower transition adaptor.

13. The method according to claim 1, wherein replacing the first energy generating unit with the second energy generating unit further comprises:
   removing the first energy generating unit from an upper end of the tower;
   removing a portion of the existing tower to define a new tower interface;
   coupling a tower transition adaptor to the new tower interface, the tower transition adaptor having a first end with a first interface sized for engaging with the new tower interface and a second end with a second interface sized for engaging with an interface on the second energy generating unit; and
   coupling the second energy generating unit to the second end of the tower transition adaptor.

14. The method according to claim 13, wherein the tower includes a plurality of tower sections, each tower section having a first end and a second end, and wherein removing a portion of the existing tower to define the new tower interface further comprises removing at least one of the tower sections such that the new tower interface is defined by an end of a tower section.

15. The method according to claims 14, wherein removing at least one of the tower sections further comprises removing the uppermost tower section.

16. The method according to claim 13, wherein the tower includes a plurality of tower sections, each tower section having a first end and a second end, and wherein removing a portion of the existing tower further comprises cutting a tower section at a location between the first and second ends such that the new tower interface is defined by the cut through the tower section.

17. The method according to claim 16, wherein cutting a tower section further comprises cutting the uppermost tower section.

18. The method according to claim 13, wherein the summation of the height of the tower at the new tower interface and the length of the tower transition adaptor is less than the height of the original tower.

19. The method according to claim 13, wherein first and second interfaces of the tower transition adaptor are sized to be different from each other.

20. The method according to claim 19, wherein first and second interfaces of the tower transition adaptor include annular flanges and the diameter of the annular flanges are different from each other.

* * * * *